(12) United States Patent
Shi

(10) Patent No.: US 12,730,319 B2
(45) Date of Patent: Sep. 8, 2026

(54) OPTICAL MODULE AND HEAD-MOUNTED DISPLAY

(71) Applicant: GOERTEK OPTICAL TECHNOLOGY CO., LTD., Weifang (CN)

(72) Inventor: Chaiyuan Shi, Shandong (CN)

(73) Assignee: Goertek Optical Technology Co., Ltd., Weifang (CN)

( * ) Notice: Subject to any disclaimer, the term of this patent is extended or adjusted under 35 U.S.C. 154(b) by 305 days.

(21) Appl. No.: 18/702,898

(22) PCT Filed: Dec. 13, 2021

(86) PCT No.: PCT/CN2021/137430
§ 371 (c)(1),
(2) Date: Apr. 19, 2024

(87) PCT Pub. No.: WO2023/092705
PCT Pub. Date: Jun. 1, 2023

(65) Prior Publication Data

US 2025/0251599 A1 Aug. 7, 2025

(30) Foreign Application Priority Data

Nov. 23, 2021 (CN) ........................ 202111397749.0

(51) Int. Cl.

| | |
|---|---|
| ***G02B 27/01*** | (2006.01) |
| ***G02B 3/04*** | (2006.01) |
| ***G02B 27/28*** | (2006.01) |

(52) U.S. Cl.
CPC .......... *G02B 27/0172* (2013.01); *G02B 3/04* (2013.01); *G02B 27/286* (2013.01); *G02B 2027/0116* (2013.01); *G02B 2027/013* (2013.01)

(58) Field of Classification Search
CPC ............. G02B 27/0172; G02B 27/286; G02B 27/283; G02B 3/04; G02B 2027/0116; G02B 2027/013
See application file for complete search history.

(56) References Cited

U.S. PATENT DOCUMENTS

2021/0199969 A1* 7/2021 Chen .................... G02B 27/286

FOREIGN PATENT DOCUMENTS

| | | |
|---|---|---|
| CN | 112596238 A | 4/2021 |
| CN | 112904537 A | 6/2021 |
| CN | 113219666 A | 8/2021 |
| CN | 110268301 A | 9/2021 |

* cited by examiner

*Primary Examiner* — Angela M. Medich
(74) *Attorney, Agent, or Firm* — Baker Botts L.L.P.

(57) ABSTRACT

The present disclosure provides an optical module and a head-mounted display. The optical module includes a third lens, a polarization reflecting film, a second lens, and a first lens arranged sequentially; a first quarter-wave plate is arranged between the third lens and the first lens; a beam-splitter provided a side of the first lens distal to the second lens; each of the first lens and the second lens has a refractive index less than that of the third lens; the first lens has a dispersion coefficient greater than that of the second lens, and the second lens has a dispersion coefficient greater than that of the third lens.

10 Claims, 4 Drawing Sheets

MTF VALUE 1.0
0.8
0.6
0.4
0.2
0

0 2.5 5.0 7.5 10.0 12.5 15.0 17.5 20.0 22.5 25.0

MTF PLOT

OPTICAL MODULE AND HEAD-MOUNTED DISPLAY

CROSS-REFERENCE TO RELATED APPLICATIONS

The present disclosure is a National Stage of International Application No. PCT/CN2021/137430, filed on Dec. 13, 2021, which claims priority to a Chinese patent application No. 202111397749.0 filed with the CNIPA on Nov. 23, 2021, both of which are hereby incorporated by reference in their entireties.

TECHNICAL FIELD

The present disclosure relates to optical display technology, and particularly to an optical module and a head-mounted display.

BACKGROUND

With the development of head-mounted displays, numerous forms and types thereof are emerging, with the application field thereof becoming more and more extensive. The requirements for the head-mounted display are getting more and more demanding, especially for volume and imaging quality of a device: to be of a smaller volume means that the size of the display in the optical system must become smaller and smaller. However, an optical system needs a plurality of lenses matching with each other, and the chromatic aberration generated by the lenses greatly reduces the imaging quality of the optical system, which affects imaging definition.

Therefore, there is a need to provide a new technical solution to solve the above technical problem.

SUMMARY

Based on this, in order to solve the problem that the chromatic aberration generated by multiple lenses in the optical system in the existing head-mounted display greatly reduces the imaging quality of the optical system, it is necessary to provide an optical module and head-mounted display intended for reducing chromatic aberration, improving imaging definition, and achieving high-definition imaging.

According to a first aspect of the present disclosure, an optical module is provided, comprising:

- a first quarter-wave plate is arranged at any position between the third lens and the first lens;
- a side of the first lens distal to the second lens is provided with a beam-splitter;
- each of the first lens and the second lens has a refractive index less than that of the third lens; and
- the first lens has a dispersion coefficient greater than that of the second lens, and the second lens has a dispersion coefficient greater than that of the third lens.

Optionally, a refractive index of each of the first lens, the second lens and the third lens ranges from 1.45 to 1.65.

Optionally, a dispersion coefficient of each of the first lens, the second lens and the third lens ranges from 20 to 75.

Optionally, the optical module further comprises a display;

- the display is used for generating circularly polarized light, elliptically polarized light or linearly polarized light;
- when the display is used for generating the linearly polarized light, the optical module further comprises a second quarter-wave plate arranged between the first lens and the display, and the second quarter-wave plate is used for converting the linearly polarized light emitted by the display into the circularly polarized light or the elliptically polarized light.

Optionally, the first lens has a positive focal power, the second lens has a positive focal power, and the third lens has a negative focal power.

Optionally, a mirror surface of the third lens on a side distal to the second lens is a concave surface.

Optionally, a mirror surface of each of the first lens, the second lens and the third lens is an aspheric surface.

Optionally, the optical module has a chromatic aberration of less than 78 μm.

Optionally, the optical module has a total optical length of TTL, then satisfying: TTL<15 mm.

According to a second aspect of the present disclosure, a head-mounted display is provided, which comprises a housing and the optical module according to any one of the first aspect, and the optical module is provided on the housing.

According to an embodiment of the present disclosure, in a technical solution of the present disclosure, when the light is projected into the first lens, the light first passes through the beam-splitter, wherein a part of the light is transmitted through the beam-splitter, and the other part of the light is reflected. After the light transmitted through the beam-splitter passes through the first lens, the second lens and the first quarter wave plate sequentially, the circularly polarized light becomes linearly polarized light. The linearly polarized light is then projected into the polarized reflective film, and at this time, the vibration direction of the linearly polarized light is different from the transmission direction of the polarized reflective film, and the light is reflected. After the reflected light passes through the first quarter-wave plate again, the linearly polarized light becomes circularly polarized light, and the polarization handedness of the light is changed. After the circularly polarized light passes through the second lens and the first lens again, it continues to be projected into the beam-splitter. When the light passes through the beam-splitter again, the light is partially reflected and passes through the first lens and the second lens in turn. After the light passes through the first quarter-wave plate again, the circularly polarized light becomes linearly polarized light, and the linearly polarized light is projected into the polarized reflective film. At this time, the polarization direction of the linearly polarized light is the same as the transmission direction of the polarized reflective film, so that the light is transmitted through the third lens to be imaged at the position of the human eye. In addition, by matching different refractive indexes and dispersion coefficients of the first lens, the second lens and the third lens, the present disclosure effectively reduces the chromatic aberration, improves the imaging definition, and achieves high-definition imaging by combining with a folded light path.

Other features and advantages of the present disclosure will become apparent from the following detailed description of exemplary embodiments of the disclosure with reference to the accompanying drawings.

BRIEF DESCRIPTION OF THE DRAWINGS

The accompanying drawings, which are incorporated in the description and constitute a part of the description, illustrate embodiments of the present disclosure and, together with the description thereof, serve to explain the principles of the present disclosure.

DESCRIPTION OF REFERENCE SIGNS

Figures 1, 2:
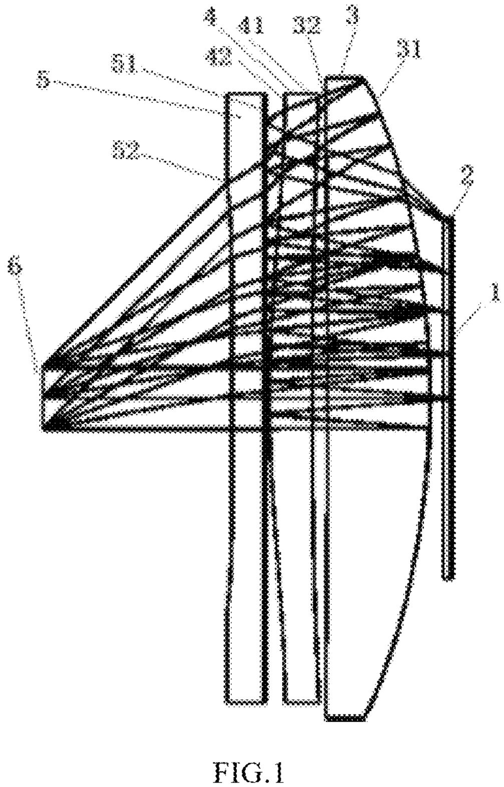
FIG. 1 is a first structural schematic diagram of an optical module in one embodiment of the present disclosure.
FIG. 2 is a first modulation transfer function diagram of the optical module in one embodiment of the present disclosure.

1. Display; 2. Protective glass; 3. First lens; 31. First surface; 32. Second surface; 4. Second lens; 41. Third surface; 42. Fourth surface; 5. Third lens; 51. Fifth surface; 52. Sixth surface; 6. Human eye.

DETAILED DESCRIPTION

Various exemplary embodiments of the present disclosure will now be described in detail with reference to the accompanying drawings. It is to be noted that unless otherwise specified, the scope of present disclosure is not limited to relative arrangements, numerical expressions and values of components and steps as illustrated in the embodiments.

Description to at least one exemplary embodiment is for illustrative purpose only, and in no way implies any restriction on the present disclosure or application or use thereof.

Techniques, methods and devices known to those skilled in the prior art may not be discussed in detail; however, such techniques, methods and devices shall be regarded as part of the description where appropriate.

In all the examples illustrated and discussed herein, any specific value shall be interpreted as illustrative rather than restrictive. Different values may be available for alternative examples of the exemplary embodiments.

It is to be noted that similar reference numbers and alphabetical letters represent similar items in the accompanying drawings. In the case that a certain item is identified in a drawing, further reference thereof may be omitted in the subsequent drawings.

According to an embodiment of the present disclosure, an optical module is provided. As shown in FIGS. 1-8, the optical module comprises a third lens 5, a polarization reflecting film, a second lens 4 and a first lens 3 which are sequentially arranged.

A first quarter-wave plate is arranged at any position between the third lens 5 and the first lens 3.

A side of the first lens 3 distal to the second lens 4 is provided with a beam-splitter.

Each of the first lens 3 and the second lens 4 has a refractive index less than that of the third lens 5.

The first lens 3 has a dispersion coefficient greater than that of the second lens 4, and the second lens 4 has a dispersion coefficient greater than that of the third lens 5.

The light used for imaging display is incident through the first lens 3 and finally emitted through the third lens 5.

The first dispersion coefficient is greater than the second dispersion coefficient, and the second dispersion coefficient is greater than the third dispersion coefficient. In this dispersion coefficient range, the first dispersion coefficient is a relatively high dispersion coefficient, the third dispersion coefficient is a lower dispersion coefficient, and the second dispersion coefficient is between the first dispersion coefficient and the third dispersion coefficient. The dispersion degree of the first lens 3 to the light is greater than that of the second lens 4, and the dispersion degree of the second lens 4 to the light is greater than that of the third lens 5.

The light incident into the first lens 3 is circularly polarized light or elliptically polarized light. When the light is projected into the first lens 3, the light first passes through the beam-splitter, wherein a part of the light is transmitted through the beam-splitter, and the other part of the light is reflected. After the light transmitted through the beam-splitter passes through the first lens 3, the second lens 4 and the first quarter wave plate sequentially, the circularly polarized light becomes linearly polarized light. The linearly polarized light is then projected into the polarized reflective film, and at this time, the vibration direction of the linearly polarized light is different from the transmission direction of the polarized reflective film, and the light is reflected. After the reflected light passes through the first quarter-wave plate again, the linearly polarized light becomes circularly polarized light, and the polarization handedness of the light is changed. After the circularly polarized light passes through the second lens 4 and the first lens 3 again, it continues to be projected into the beam-splitter. When the light passes through the beam-splitter again, the light is partially reflected and passes through the first lens 3 and the second lens 4 in turn. After the light passes through the first quarter-wave plate again, the circularly polarized light becomes linearly polarized light, and the linearly polarized light is projected into the polarized reflective film. At this time, the polarization direction of the linearly polarized light is the same as the transmission direction of the polarized reflective film, so that the light is transmitted through the third lens 5 to be imaged at the position of the human eye 6.

In the present embodiment, by matching different refractive indexes and dispersion coefficients of the first lens, the second lens and the third lens, the present disclosure effectively reduces the chromatic aberration, improves the imaging definition, and achieves high-definition imaging by combining with a folded light path formed by multiple reflections of light.

For example, the beam-splitter may be a transflective film.

For example, the first quarter-wave plate is arranged between the polarized reflective film and the first lens 3.

For example, the first lens 3 has a first surface 31 and a second surface 32, the second lens 4 has a third surface 41 and a fourth surface 42, and the third lens 5 has a fifth surface 51 and a sixth surface 52.

The first surface 31, the second surface 32, the third surface 41, the fourth surface 42, the fifth surface 51 and the sixth surface 52 are arranged sequentially. The beam-splitter is provided on the side where the first surface 31 is located.

Optionally, each of the second surface 32, the third surface 41, the fourth surface 42 and the sixth surface 52 is provided with an anti-reflective film layer.

In an embodiment, the optical module further comprises a display 1. The display 1 is used for generating the circularly polarized light, the elliptically polarized light or the linearly polarized light.

When the display 1 is used for generating the linearly polarized light, the optical module further comprises a second quarter-wave plate arranged between the first lens 3 and the display 1, and the second quarter-wave plate is used for converting the linearly polarized light emitted by the display 1 into the circularly polarized light or the elliptically polarized light.

In the present embodiment, the display 1 is used for emitting light for presenting a picture. By setting the light projected into the first lens 3 as the circularly polarized light or the elliptically polarized light, the light may form a folded light path in the optical module so as to meet the imaging requirements of the optical module in the present disclosure.

In an embodiment, the refractive index of each of the first lens 3, the second lens 4 and the third lens 5 ranges from 1.45 to 1.65.

In the refractive index range, the light path of the picture light may always be in the light path of the optical module, which ensures that the optical module can effectively affect the light of the imaging display.

In an embodiment, the dispersion coefficient of each of the first lens 3, the second lens 4 and the third lens 5 ranges from 20 to 75.

In the dispersion coefficient range, the matched first lens 3, the second lens 4, and the third lens 5 may produce lower chromatic aberration to the transmitted light, thereby improving the imaging quality.

In an embodiment, the first lens 3 has a positive focal power, the second lens 4 has a positive focal power, and the third lens 5 has a negative focal power.

The positive focal power of the first lens 3, the positive focal power of the second lens 4 and the negative focal power of the third lens 5 are matched, and the optical module has higher imaging quality under deflection effect of the first lens 3, the second lens 4 and the third lens 5 on the light.

Figure 5:
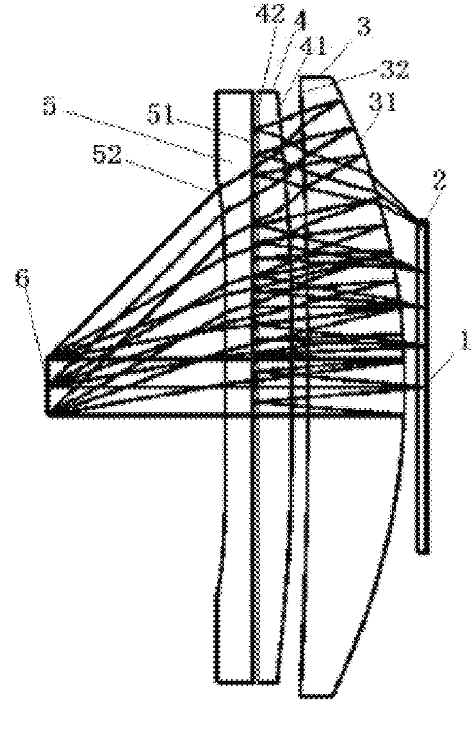
FIG. 5 is a second structural schematic diagram of the optical module in one embodiment of the present disclosure.

In an embodiment, as shown in FIGS. 1 and 5, a mirror surface of the third lens 5 on a side distal to the second lens 4 is a concave surface. For example, the sixth surface 52 is a concave surface.

The sixth surface 52 is a surface from which the imaging light of the optical module is finally emitted, and is located at the outermost side. By setting the sixth surface 52 to be concave, it is possible to reduce the convex structure and make the structure of the optical module more compact, thereby reducing the volume of the optical module.

In an embodiment, a mirror surface of each of the first lens 3, the second lens 4 and the third lens 5 is an aspheric surface.

For example, each of the first surface 31, the second surface 32, the third surface 41, the fourth surface 42, the fifth surface 51, and the sixth surface 52 is an aspheric surface.

The aspheric surface may correct graphics in the picture light, solve the problem of view distortion, and make the optical module lighter and thinner. It is also possible to maintain excellent impact resistance.

In an embodiment, as shown in FIGS. 1-4, the refractive index of the first lens 3 is 1.55, and the dispersion coefficient of the first lens 3 is 71.7. The refractive index of the second lens 4 is 1.5, and the dispersion coefficient of the second lens 4 is 53. The refractive index of the third lens 5 is 1.64, and the dispersion coefficient of the third lens 5 is 22.4.

In the embodiment, the above refractive indexes and dispersion coefficients enable the picture light to be effectively folded in the first lens 3, the second lens 4 and the third lens 5, such that after the light path is folded, the picture with higher definition is projected through the sixth surface 52.

Optionally, the optical power of the first lens 3 is 0.052, the optical power of the second lens 4 is 0.006, and the optical power of the third lens 5 is −0.00025.

The first lens 3, the second lens 4 and the third lens 5 can realize that the picture light passing through the optical module can output an image with lower chromatic aberration and higher definition.

The optical module has a total optical length of TTL, then satisfying: TTL<15 mm.

In the total optical length, the optical module occupies a smaller space, so that the optical module can be applied in a smaller device, thereby reducing the volume of the overall structure.

For example, the central thickness of the first lens 3 is: 3 mm<T<8 mm. The central thickness of the second lens 4 is: 3 mm<T<5 mm. The central thickness of the third lens 5 is: 3 mm<T<5 mm.

By setting the thickness of the first lens 3, the second lens 4 and the third lens 5, the thickness of the optical module is controlled to be less than 15 mm, so that the optical module has a smaller thickness, so as to effectively reduce the space occupied by the optical module.

FIG. 1 is a structural schematic diagram of the optical module in the present disclosure. Wherein, the sixth surface 62 is a concave surface. On the basis of satisfying the selection of the first lens 3, the second lens 4 and the third lens 5 in the embodiment, a person skilled in the art may correspondingly set the first surface 31, the second surface 32, the third surface 41, the fourth surface 42 and the fifth surface 51 as one of the concave surface, the convex surface and the flat surface respectively. For example, the first surface 31 is a convex surface, the second surface 32 is a concave surface, the third surface 41 is a concave surface, the fourth surface 42 is a convex surface, the fifth surface 51 is a flat surface, and the sixth surface 52 is a concave surface.

FIG. 2 is a modulation transfer function diagram of the optical module in the present embodiment. The modulation transfer function value of the optical module is >0.3 at a resolution below 25 lp/mm.

In the modulation transfer function diagram, it is possible to characterize the imaging definition by the contrast of the black and white line pairs. The modulation transfer function value of the optical module is >0.3 at a resolution below 25 lp/mm. The optical module is characterized by clear imaging.

Figure 3:
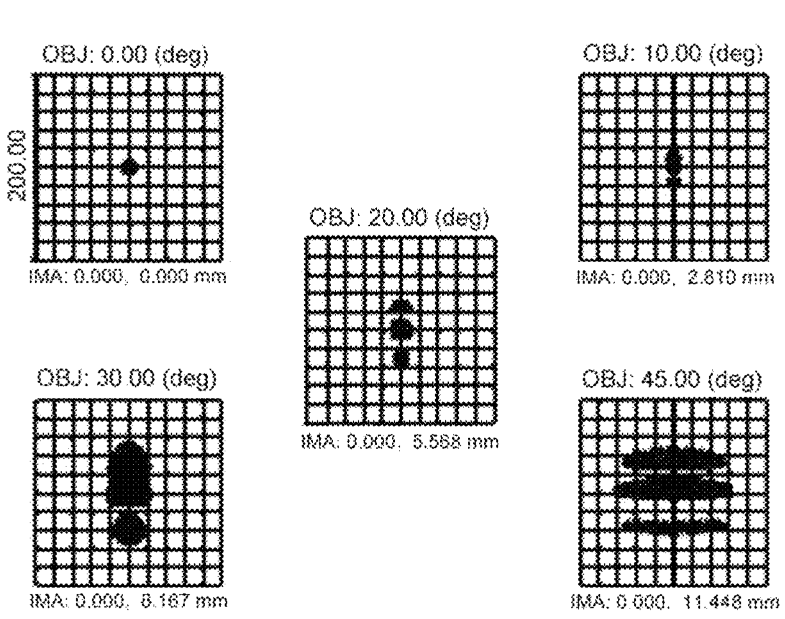
FIG. 3 is a first plot diagram of the optical module in one embodiment of the present disclosure.

FIG. 3 is a plot diagram of the optical module in the present embodiment. In the plot diagram of the optical module, the maximum value of the full-band image point is <38 μm, and the spot diameter in the present embodiment is less than 38 μm.

The spot diameter may be characterized by the plot diagram. The plot diagram is a dispersion pattern scattered in a certain range generated by the fact that the intersection of many light rays emitted from one point, after passing through the optical module, is no longer concentrated at the same point with the image plane due to aberrations, and can characterize imaging quality. In the plot diagram of the optical module, the maximum value of the full-band image point corresponds to the maximum field of view, and the maximum value of the full-band image point is <38 μm. The optical module has better imaging quality.

Figure 4:
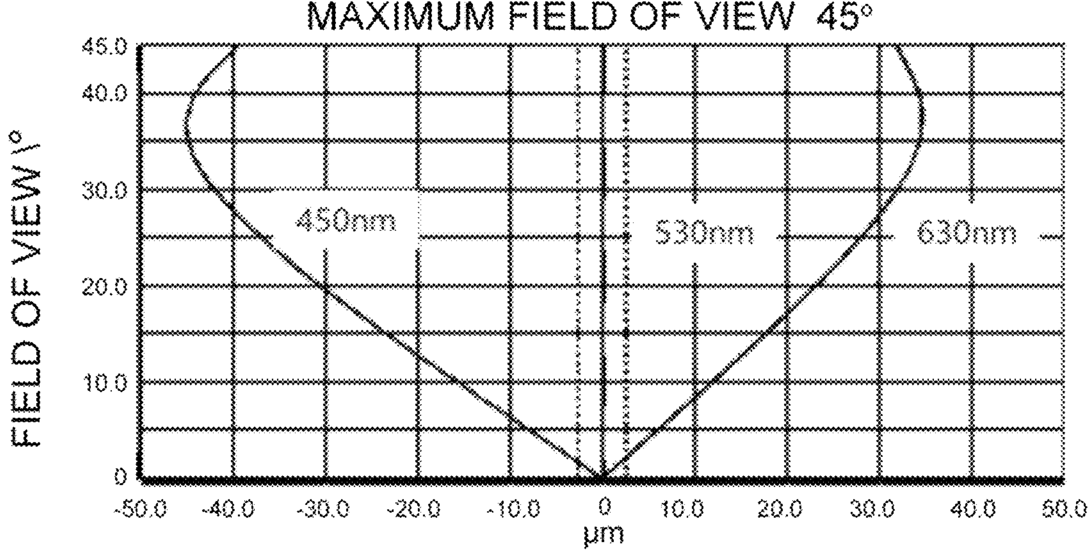
FIG. 4 is a first vertical chromatic aberration diagram of the optical module in one embodiment of the present disclosure.

As shown in FIG. 4, it is a vertical chromatic aberration diagram of the optical module. The optical module has the maximum dispersion located at 0.8 field of view, the maximum chromatic aberration less than 78 μm, and the maximum field of view of 90°.

The chromatic aberration values may be shown by the vertical chromatic aberration diagram. The vertical chromatic aberration, also known as the lateral chromatic aberration, refers to the difference between the focal positions of blue light and red light on the image plane when a polychromatic principal ray on the object side is transformed into multiple rays on the image side due to the dispersion of the refractive system. The optical module has the maximum dispersion located at 0.8 field of view, the maximum chromatic aberration less than 78 μm, and the maximum field of view of 90°, and has smaller chromatic aberration values and field of view angles.

The design results of the present embodiment are referred to Table 1, wherein the aspheric surface coefficient may satisfy the following equation:

$$z = \frac{CY^2}{1 + \sqrt{1 - (1+k)C^2Y^2}} + \sum_{i=2}^{N} \alpha_i Y^{2i}$$

Wherein, z is the coordinate along the direction of the optical axis, Y is the radial coordinate in units of the lens length, C is the curvature (1/R), k is the conic constant, αi is the coefficient of each higher order term, and 2i is the higher order of the aspheric surface (the order of Aspherical Coefficient). The data represented by a4, a6 and a8 in Table 1 are the fourth-order, sixth-order and eighth-order coefficients that are used to be put into the corresponding surface shape calculation formula.

The parameters of the optical module in the present embodiment are shown in Table 1.

The first lens 3, the second lens 4 and the third lens 5 can realize that the picture light passing through the optical module can output an image with lower chromatic aberration and higher definition.

The optical module has a total optical length of TTL, then satisfying: TTL<15 mm.

In the total optical length, the optical module occupies a smaller space, so that the optical module can be applied in a smaller device, thereby reducing the volume of the overall structure.

For example, the central thickness of the first lens 3 is: 3 mm<T<8 mm. The central thickness of the second lens 4 is: 3 mm<T<5 mm. The central thickness of the third lens 5 is: 3 mm<T<5 mm.

By setting the thickness of the first lens 3, the second lens 4 and the third lens 5, the thickness of the optical module is controlled to be less than 15 mm, so that the optical module has a smaller thickness, so as to effectively reduce the space occupied by the optical module.

FIG. 5 is a structural schematic diagram of the optical module in the present disclosure. Wherein, the sixth surface 62 is a concave surface. On the basis of satisfying the selection of the first lens 3, the second lens 4 and the third lens 5 in the embodiment, a person skilled in the art may correspondingly set the first surface 31, the second surface 32, the third surface 41, the fourth surface 42 and the fifth surface 51 as one of the concave surface, the convex surface and the flat surface respectively. For example, the first surface 31 is a convex surface, the second surface 32 is a concave surface, the third surface 41 is a concave surface, the fourth surface 42 is a convex surface, the fifth surface 51 is a flat surface, and the sixth surface 52 is a concave surface.

Figure 6:
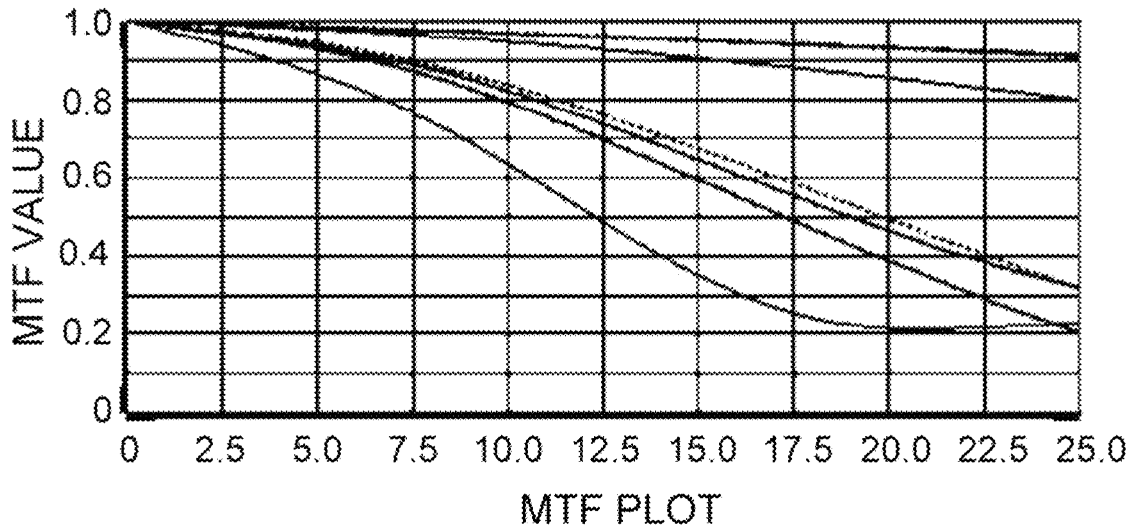
FIG. 6 is a second modulation transfer function diagram of the optical module in one embodiment of the present disclosure.

FIG. 6 is a modulation transfer function diagram of the optical module in the present embodiment. The modulation transfer function value of the optical module is >0.2 at a resolution below 25 lp/mm.

TABLE 1

| Lens Surface | radius | Thickness | Material | a4 | a6 | a8 |
|---|---|---|---|---|---|---|
| Sixth surface | −2558.9 | 2 | OKP1 | 1.4E−06 | −5.1E−08 | 2.2E−11 |
| Fifth Surface | inf | 0.2 | | 0.0E+00 | 0.0E+00 | 0.0E+00 |
| Fourth Surface | 91.3 | 3.0 | APEL | −7.3E−06 | 0.0E+00 | 0.0E+00 |
| Third Surface | −1708.1 | 0.9 | | 1.0E−05 | −2.7E−08 | 2.4E−11 |
| Second Surface | −1400.0 | 6.8 | MC-FCD500 | 2.7E−07 | 0.0E+00 | 0.0E+00 |
| First Surface | −59.6 | 1.5 | | −2.0E−06 | −1.3E−09 | 0.0E+00 |

The optical module in the present embodiment may fold the picture light to ensure high resolution. The high-definition picture display effect is realized in a compact structure.

In an embodiment, as shown in FIGS. 5-8, the refractive index of the first lens is 1.47, and the dispersion coefficient of the first lens is 66.7; the refractive index of the second lens is 1.5, and the dispersion coefficient of the second lens is 53; the refractive index of the third lens is 1.64, and the dispersion coefficient of the third lens is 22.4.

In the present embodiment, the above refractive indexes and dispersion coefficients enable the picture light to be effectively folded in the first lens 3, the second lens 4 and the third lens 5, such that after the light path is folded, the picture with higher definition is projected through the sixth surface 52.

Optionally, the optical power of the first lens is 0.05203, the optical power of the second lens is 0.0059, and the optical power of the third lens is −0.0002.

In the modulation transfer function diagram, it is possible to characterize the imaging definition by the contrast of the black and white line pairs. The modulation transfer function value of the optical module is >0.2 at a resolution below 25 lp/mm. The optical module is characterized by clear imaging.

Figure 7:
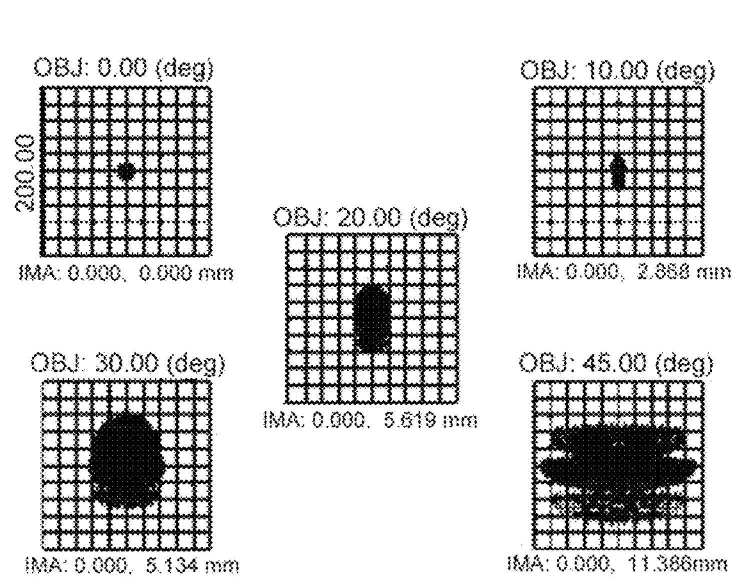
FIG. 7 is a second plot diagram of the optical module in one embodiment of the present disclosure.
Figure 7:
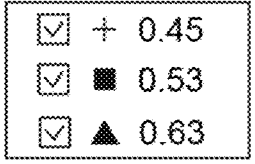

FIG. 7 is a plot diagram of the optical module in the present embodiment. In the plot diagram of the optical module, the maximum value of the full-band image point is <40 μm.

In the plot diagram of the optical module, the maximum value of the full-band image point is <40 μm, and the spot diameter in this embodiment is less than 40 μm. The optical module has better imaging quality.

Figure 8:
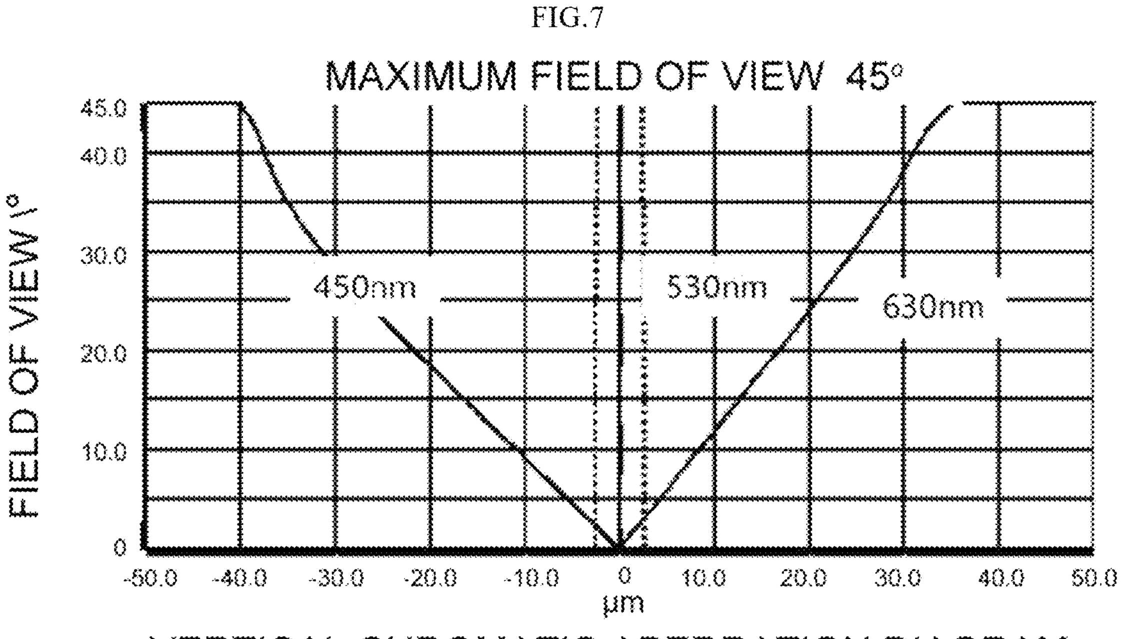
FIG. 8 is a second vertical chromatic aberration diagram of the optical module in one embodiment of the present disclosure.

As shown in FIG. 8, it is a vertical chromatic aberration diagram of the optical module. The optical module has the maximum dispersion located at the largest position of the field of view, the maximum chromatic aberration less than 75 μm, and the maximum field of view of 90°.

The optical module has the maximum dispersion located at the largest position of the field of view, the maximum chromatic aberration less than 75 μm, and the maximum field of view of 90°.

The design results of the present embodiment are referred to Table 2, wherein the aspheric surface coefficient may satisfy the following equation:

$$z = \frac{CY^2}{1 + \sqrt{1 - (1+k)C^2Y^2}} + \sum_{i=2}^{N} \alpha_i Y^{2i}$$

Wherein, z is the coordinate along the direction of the optical axis, Y is the radial coordinate in units of the lens length, C is the curvature (1/R), k is the conic constant, αi is the coefficient of each higher order term, and 2i is the higher order of the aspheric surface (the order of Aspherical Coefficient). The data represented by a4, a6 and a8 in Table 1 are the fourth-order, sixth-order and eighth-order coefficients that are used to be put into the corresponding surface shape calculation formula.

The parameters of the optical module in the present embodiment are shown in Table 1

TABLE 2

| Lens Surface | radius | Thickness | Material | a4 | a6 | a8 |
|---|---|---|---|---|---|---|
| Sixth surface | 4075.1 | 2.0 | OKP1 | −4.4E−06 | −4.5E−08 | 2.7E−11 |
| Fifth Surface | inf | 0.2 | | 0.0E+00 | 0.0E+00 | 0.0E+00 |
| Fourth Surface | inf | 3.0 | APEL | 0.0E+00 | 0.0E+00 | 0.0E+00 |
| Third Surface | −485.3 | 1.1 | | −4.6E−06 | −4.8E−09 | 1.9E−11 |
| Second Surface | −441.9 | 6.9 | FC1 | 0.0E+00 | 0.0E+00 | 0.0E+00 |
| First Surface | −49.3 | 1.5 | | 0.0E+00 | 0.0E+00 | 0.0E+00 |

The optical module in the present embodiment may fold the picture light to ensure high resolution. The high-definition picture display effect is realized in a compact structure.

According to an embodiment of the present disclosure, a head-mounted display is provided, comprising the optical module according to any one of the embodiments of the present disclosure.

The head-mounted display has the technical effect brought by the optical module.

For example, the head-mounted display further comprises a display 1 and a protective glass 2 arranged on the surface of the display 1. The display 1 is used for emitting picture light of the head-mounted display, and the protective glass 2 is arranged on the surface of the display 1 to form protection. After transmitting through the protection glass 2, the picture light is projected into the optical module through the first surface 31, and is finally emitted out of the optical module through the sixth surface 52 toward the position of the human eye 6 of the user wearing the head-mounted display, so as to form an image in the area of the human eye 6. When the head-mounted display is used, the imaging light is incident into the area of the human eye 6 so that the picture light is incident into the human eye 6.

The above embodiments focus on the differences among the embodiments, and the different optimization features among the embodiments may be combined to form a better embodiment as long as they are not contradictory. Considering the brevity of the text, the description will not be elaborated herein.

Although the present disclosure has been described in detail in connection with some specific embodiments by way of illustration, those skilled in the art should understand that the above examples are provided for illustration only and should not be taken as a limitation on the scope of the disclosure. Those skilled in the art will appreciate that modifications may be made to the above embodiments without departing from the scope and spirit of the present disclosure. We therefore claim as our disclosure all that comes within the scope of the appended claims.

The invention claimed is:

1. An optical module, comprising a first lens having a first dispersion coefficient, a second lens having a second dispersion coefficient, a polarization reflecting film, and a third lens having a third dispersion coefficient arranged sequentially;

a first quarter-wave plate arranged between the third lens and the first lens; and a beam-splitter provided at a side of the first lens distal to the second lens;

wherein each of the first lens and the second lens has a refractive index less than that of the third lens; and the first dispersion coefficient is greater than the second dispersion coefficient, and the second lens has a dispersion coefficient is greater than the third dispersion coefficient.

2. The optical module according to claim 1, wherein the refractive index of each of the first lens, the second lens, and the third lens ranges from 1.45 to 1.65.

3. The optical module according to claim 1, wherein each of the first dispersion coefficient, the second dispersion coefficient and the third dispersion coefficient ranges from 20 to 75.

4. The optical module according to claim 1, further comprises a display;

wherein the display is used for generating circularly polarized light, elliptically polarized light or linearly polarized light;

when the display is used for generating the linearly polarized light, the optical module further comprises a second quarter-wave plate arranged between the first lens and the display, and the second quarter-wave plate is adapted to convert the linearly polarized light emitted by the display into the circularly polarized light or the elliptically polarized light.

5. The optical module according to claim 1, wherein the first lens has a positive focal power, the second lens has a positive focal power, and the third lens has a negative focal power.

6. The optical module according to claim 1, wherein a mirror surface of the third lens on a side distal to the second lens comprises a concave surface.

7. The optical module according to claim 1, wherein a mirror surface of each of the first lens, the second lens, and the third lens comprises an aspheric surface.

8. The optical module according to claim 1, wherein the optical module has a chromatic aberration of less than 78 μm.

9. The optical module according to claim 1, wherein the optical module has a total optical length of TTL<15 mm.

10. A head-mounted display, comprising a housing and the optical module according to claim 1, wherein the optical module is provided on the housing.

* * * * *